United States Patent [19]

Yang

[11] 4,403,966

[45] Sep. 13, 1983

[54] CHILDREN CONDUCTIVE INTELLIGENCE AUTOSUGGESTION MACHINE

[76] Inventor: Rong-Juh Yang, No. 242, Ta-Lung St., Taipei, Taiwan

[21] Appl. No.: 252,671

[22] Filed: Apr. 20, 1981

[51] Int. Cl.³ .............................................. G09B 3/00
[52] U.S. Cl. ................................... 434/335; 434/169
[58] Field of Search ............... 434/167, 169, 176, 327, 434/235

[56] References Cited

U.S. PATENT DOCUMENTS

| 2,855,700 | 10/1958 | Rock | 434/176 |
| 3,172,214 | 3/1965 | Aberge et al. | 434/167 |
| 3,508,349 | 4/1970 | Gilden | 434/335 |
| 3,673,712 | 7/1972 | Dacey et al. | 434/167 |

FOREIGN PATENT DOCUMENTS 569331   5/1945   United Kingdom ................ 434/176

Primary Examiner—William H. Grieb
Attorney, Agent, or Firm—Cushman, Darby & Cushman

[57] ABSTRACT

A children's educational device including a user actuable keyboard having a plurality of keys for selecting a drawing or word corresponding to a selected word or drawing on a movable holder and displayed via a display window to achieve an educational or recreational effect.

7 Claims, 3 Drawing Figures

CHILDREN CONDUCTIVE INTELLIGENCE AUTOSUGGESTION MACHINE

BACKGROUND OF THE INVENTION

This invention relates in general to children's educational devices and toys. More specifically, the invention relates to autosuggestion machines of the type whereby a child is trained to correlate words or pictures from a first group with pictures or words of a second group corresponding thereto. Typically, such devices would be used for teaching or recreation.

SUMMARY OF THE INVENTION

The present invention provides an educational device in the form of an autosuggestion machine. It is intended for use by pre-school or primary grade children. The device comprises a machine box having two information support holders, one holder being fixed with respect to the machine box and other being movable with respect thereto. Each holder includes a transparent board and configured to receive an information support and retain it under its respective transparent board. The box includes an indicator window for displaying one at a time the items of information of the information support associated with the movable member such that when the movable member moves, a single item of information is displayed through the indicator window. The second holder has associated therewith a keyboard having a plurality of keys, one key associated with each item of information of the information support contained therein. The user manipulates the useable holder such that one item of information on the support retained therein is displayed through the indicator window. The objective is to depress the appropriate key of the keyboard corresponding to the item of information displayed by the fixed information support corresponding to that displayed via the indicator window. If a correct association is achieved, an alarm is actuated. This alarm can be an audible sound or a light. Means are provided for actuating the alarm only when the correct key is depressed. The actuating means comprises at least one element fixed to the movable support such that it will be in the correct position to be actuated by a correct key associated with an item of information on the fixed support corresponding to whatever item of information of the information support associated with the movable member is displayed via the indicator window. The user can press keys repeatedly until achieving the alarm indicating a correct answer. Thus, the user is directed to discriminate between correct and incorrect answers and is prompted so as to promote his interest and teach the information displayed.

BRIEF DESCRIPTION OF THE DRAWINGS

The presently preferred best mode embodiment of the present invention will be described in detail with reference to the drawing wherein.

DETAILED DESCRIPTION OF THE PREFERRED EMBODIMENT

Figure 1:
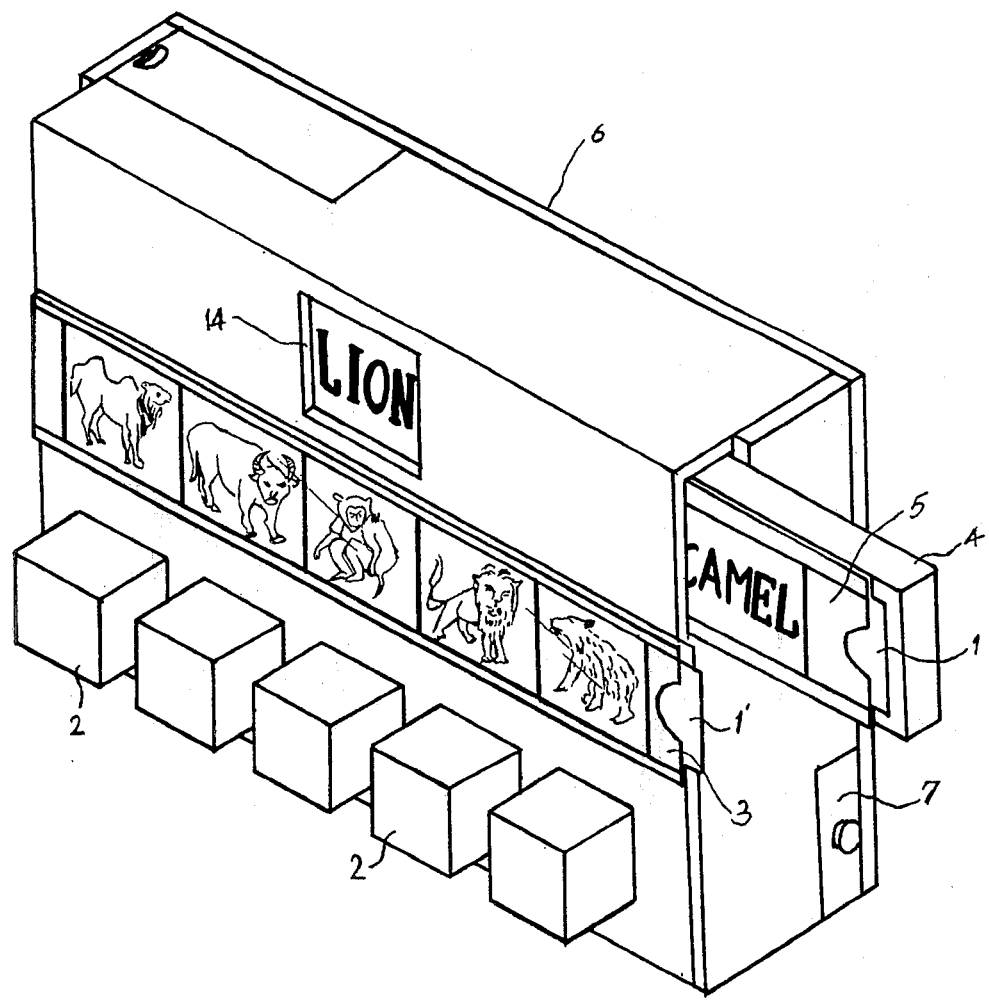
FIG. 1 is a perspective view of the educational device according to the present invention.

Referring now to FIG. 1 there is shown a perspective view of the education device according to the present invention. The device includes a machine box 6 having an indicator window 14 therein. A first transparent board 3 constituting a first holding means is fixed in position with respect to machine box 6. Transparent board 3 is intended to receive a figure-plate 1' constituting a first information support. Figure-plate 1' includes a plurality of information items signified by the five animal drawings shown in the drawing. First transparent board 3 is divided into sections such that an inserted figure-plate 1' will have each item of information, i.e., each drawing, appear at a predetermined corresponding section of transparent board 3.

Associated with transparent board 3 is a keyboard including a plurality of keys 2, each key being associated with a section of transparent board 3 and therefore being associated with a single item of information of figure-plate 1' inserted therein. As shown in the figure, transparent board 3 is configured such that figure-plate 1' can be slid therein and retained by grooves at the upper and lower portion thereof.

A second transparent board 5 is associated with a sliding plate 4, slidable with respect to machine box 6. Second transparent board 5 constitutes a second holding means intended to receive a figure-plate 1' therein. Figure-plate 1', like figure-plate 1' includes a plurality of information items corresponding to the information items of figure-plate 1'. The information items of figure-plate 1' can be displayed one at a time via indicator window 14 depending upon the slide position of sliding plate 4. It is intended that sliding plate 4 be manipulated by the user so as to display any item of information of figure-plate 1 via indicator window 14.

Machine box 6 also includes a storage box 7 for storing sets of figure-plates, such as figure-plates 1 and 1'. Typically, one figure-plate of the set will include pictures and the other words for teaching reading. Of course, other items of information could be used for teaching other skills. For example, one figure-plate of the pair might contain mathematical expressions and the other might contain pictures related thereto for teaching counting, etc.

Figure 2:
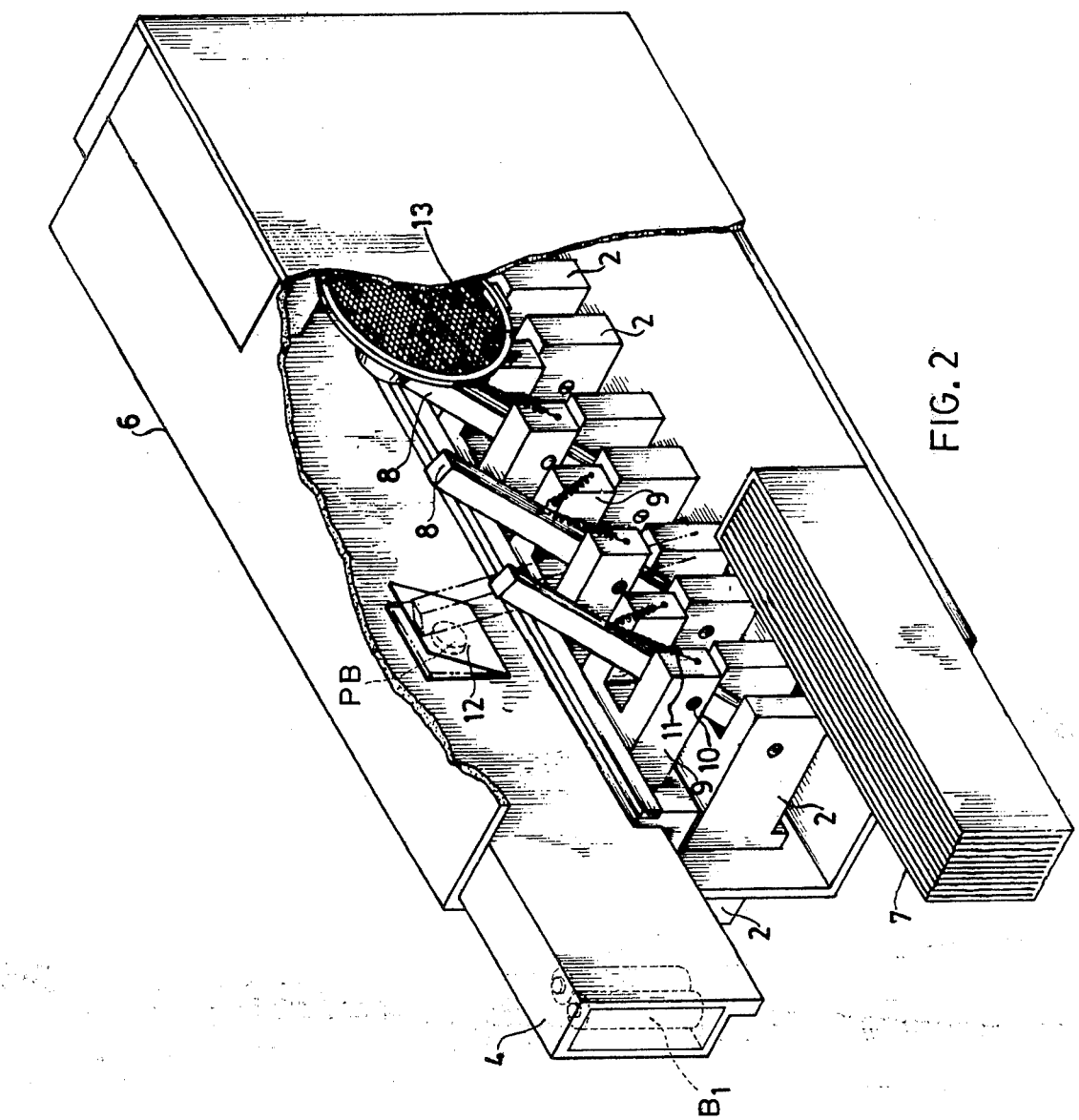
FIG. 2 is a cutaway rear perspective view of the device according to the present invention showing its inner workings.

Referring now to FIG. 2 there is shown a rear perspective cutaway view of the teaching device according to the present invention in order to illustrate its working parts. Each key 2 has associated with it a guiding rod 8 movably positioned within a foundation 9. A shaft 10 passes through bores in the foundations and guiding rods 8 so that the guiding rods may pivot upon actuation of an associated key 2. The guiding rods 8 are spring-biased by a hauling spring 11. A spring piece 12 constituting a switch member is positioned at a predetermined location along the backside of sliding plate 4. By moving sliding plate 4 back and forth, spring piece 12 will become positioned so that it can be actuated by one of the guiding rods 8 associated with key 2. Spring piece 12 is of such a size that it can only be actuated by one guiding rod 8 associated with a key 2. By having spring-piece 12 at such a fixed position on sliding plate 4, it will be actuated only when the correct key 2 is depressed corresponding to the information displayed via display window 14. Spring piece 12 constitutes a switch member associated with an electrical circuit, not shown, for sounding an alarm when the correct key is depressed thereby closing the switch. If the alarm is audible, a sound is played through a speaker 13 positioned in the rear of machine box 6. If the alarm is a light, the spring piece 12 actuates an electrical circuit for driving the light.

As an alternative, spring piece 12 could be replaced by a chime actuatable by the striking action of a guiding rod 8. As shown, storage box 7 contains a plurality of spare plates such as figure-plate 1 and 1' shown in FIG. 1.

Using the positioning of spring piece 12 on sliding plate 4, actuation of the spring piece is facilitated by marking the information items on figure-plate 1 in reverse linear order to those of figure-plate 1' as shown in FIG. 1.

Referring again to FIG. 1, there is shown a specific example. In this case, the word "LION" is one of the information items on figure-plate 1. Figure-plate 1 is positioned so as to be retained in sliding plate 4 and sliding plate 4 is moved to a position such that the word "LION" is displayed via indicator window 14. The picture corresponding to the word "LION" is second from the right on figure-plate 1' and therefore corresponds to the key 2 that is second from the right.

Referring again to FIG. 2, when the key second from the right is depressed, the top end of guiding rod 8 moves toward spring piece 12 in order to actuate it. Spring piece 12 is in such a position that it will be actuated by the top end of guiding rod 8 only. Therefore, the spring piece will be actuated only when the key seond from the right is pressed thereby calling for a correct correspondence between the word "LION" appearing in indicator window 14 and the picture of a lion second from the right on figure-plate 1'. As an alternative embodiment, the figure-plate may be replaced by one or more round disks.

Figure 3:
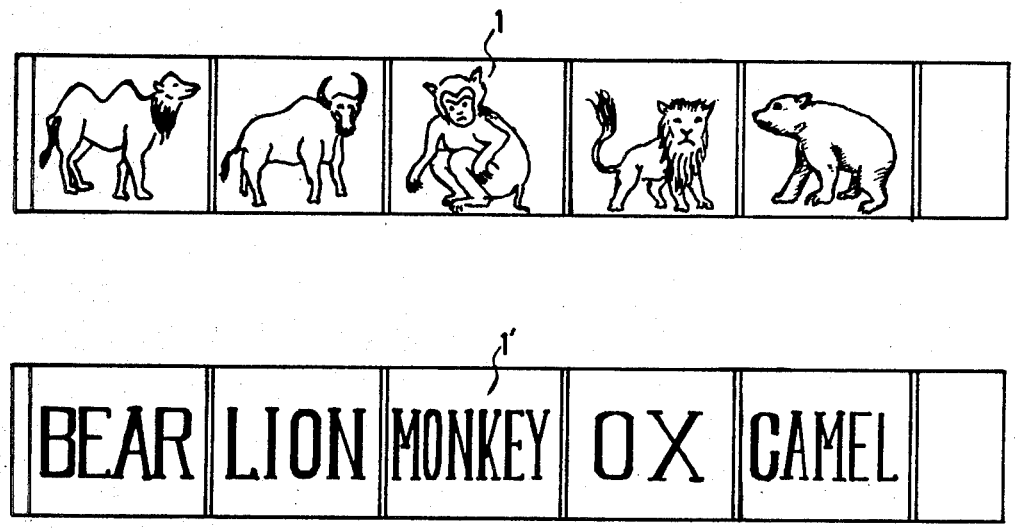
FIG. 3 is a diagram of a pair of first and second information supports used with the other portions of the device.

Referring now to FIG. 3, there is shown in detail a complete figure plate 1 and 1'. The upper portion of the figure shows figure-plate 1 including five drawings each constituting an information item of figure-plate 1. Figure-plate 1 would be positioned in either the sliding plate 4 or in first transparent board 3. In the lower portion of FIG. 3 there is shown a corresponding figure-plate 1' including words corresponding to each of the pictures of figure-plate 1. As shown in the diagram of this linear embodiment, the words are in reverse linear order to the pictures. In figure-plate 1 in the upper portion of FIG. 3, the "CAMEL" is shown to the extreme left. Corresponding with the drawing of a camel is the word "CAMEL" in the rightmost information item of figure-plate 1'. Similarly, the drawing of a bear in the rightmost information item of figure-plate 1 corresponds to the word "BEAR" as the leftmost information item of figure-plate 1'.

While the information has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:

1. An educational device comprising:
    a machine box having a display window therein;
    a first information bearing support having a plurality of information items;
    a second information bearing support having a plurality of information bearing items, each item of said second support corresponding to an information item of said first support;
    a first holding means fixed to said box and divided into a plurality of sections for holding said first information support, each section for displaying one item of information of said first information support, all times of said information support being displayed simultaneously;
    a set of user actuated keys, one key being associated with each section of said first holding means and corresponding to one item of information of said first information support;
    a second holding means, movable with respect to said machine box for holding said second information support for displaying one at a time, an item of information of said second information support via said display window; and
    means associated with said keys for actuating an alarm when a key associated with an item of information of said first support corresponding to the item of information of said second support displayed via said display window is depressed; and
    an alarm actuatable by said means for actuating to produce an alarm when a key is depressed corresponding to the item of information displayed via said display window.

2. A device according to claim 1 wherein said first holding means comprises a transparent plate and wherein said first information support is received and retained therein by said first holding means such that the information items thereof are visible through said transparent plate.

3. A device according to claim 1 or 2 wherein said second holding means comprises a transparent plate and wherein said second information support is received and retained therein by said second holding means such that the information items thereof are visible through said transparent plate.

4. A device according to claim 1 wherein said first and second information supports are linear and wherein corresponding information items of said supports are arranged in reverse linear order on said supports.

5. A device according to claim 1 wherein said alarm comprises an electric circuit.

6. A device according to claim 5 wherein said alarm is a light.

7. A device according to claim 5 wherein said alarm is a sound.

* * * * *